(12) United States Patent
Surjaatmadja et al.

(10) Patent No.: US 7,506,689 B2
(45) Date of Patent: Mar. 24, 2009

(54) FRACTURING FLUIDS COMPRISING DEGRADABLE DIVERTING AGENTS AND METHODS OF USE IN SUBTERRANEAN FORMATIONS

(75) Inventors: Jim B. Surjaatmadja, Duncan, OK (US); Bradley L. Todd, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 164 days.

(21) Appl. No.: 11/062,956

(22) Filed: Feb. 22, 2005

(65) Prior Publication Data

US 2006/0185848 A1    Aug. 24, 2006

(51) Int. Cl.
*E21B 43/267* (2006.01)
(52) U.S. Cl. .................................... 166/280.2
(58) Field of Classification Search .................. None
See application file for complete search history.

(56) References Cited

U.S. PATENT DOCUMENTS

| | | | |
|---|---|---|---|
| 2,238,671 A | 4/1941 | Woodhouse | 166/21 |
| 2,703,316 A | 3/1955 | Palmer | 260/78.3 |
| 3,173,484 A | 3/1965 | Huitt et al. | 166/280.1 |
| 3,195,635 A | 7/1965 | Fast | 166/280.1 |
| 3,302,719 A | 2/1967 | Fischer | 166/280.2 |
| 3,364,995 A | 1/1968 | Atkins et al. | 166/280.1 |
| 3,366,178 A | 1/1968 | Malone et al. | 166/280.1 |
| 3,455,390 A | 7/1969 | Gallus | 166/295 |
| 3,784,585 A | 1/1974 | Schmitt et al. | 260/861 |
| 3,819,525 A | 6/1974 | Hattenbrun | 252/132 |
| 3,828,854 A | 8/1974 | Templeton et al. | 166/307 |
| 3,836,465 A | 9/1974 | Rhudy et al. | |
| 3,868,998 A | 3/1975 | Lybarger et al. | 166/278 |
| 3,912,692 A | 10/1975 | Casey et al. | 260/78.3 |
| 3,948,672 A | 4/1976 | Harnsberger | 106/90 |
| 3,955,993 A | 5/1976 | Curtice et al. | 106/90 |
| 3,960,736 A | 6/1976 | Free et al. | 252/8.55 R |
| 3,968,840 A | 7/1976 | Tate | 166/280.1 |
| 3,986,355 A | 10/1976 | Klaeger | |
| 3,998,272 A | 12/1976 | Maly | 166/281 |
| 3,998,744 A | 12/1976 | Arnold et al. | 507/269 |
| 4,010,071 A | 3/1977 | Colegrove | |
| 4,068,718 A | 1/1978 | Cooke, Jr. et al. | 166/280.2 |

(Continued)

FOREIGN PATENT DOCUMENTS

EP        0 510 762 A2    10/1992

(Continued)

OTHER PUBLICATIONS

Search Report and Written Opinioin No. PCT/GB2006/000507.

(Continued)

*Primary Examiner*—Jennifer H Gay
*Assistant Examiner*—Kerry W Leonard
(74) *Attorney, Agent, or Firm*—Robert A. Kent; Baker Botts LLC

(57) ABSTRACT

Treatment fluids comprising degradable diverting agents and methods of using such treatment fluids in subterranean formations are provided. Examples of methods include methods of fracturing a subterranean formation. Another example of a method is a method of enhancing production from multiple regions of a subterranean formation penetrated by a well bore during a single trip through the well bore.

17 Claims, 4 Drawing Sheets

U.S. PATENT DOCUMENTS

| | | | |
|---|---|---|---|
| 4,169,798 A | 10/1979 | DeMartino | 252/8.55 R |
| 4,172,066 A | 10/1979 | Zweigle et al. | 260/29.6 TA |
| 4,261,421 A | 4/1981 | Watanabe | 166/281 |
| 4,265,673 A | 5/1981 | Pace et al. | |
| 4,299,825 A | 11/1981 | Lee | |
| 4,387,769 A | 6/1983 | Erbstoesser et al. | 166/295 |
| 4,460,052 A | 7/1984 | Gockel | 175/72 |
| 4,470,915 A | 9/1984 | Conway | 252/8.55 R |
| 4,498,995 A | 2/1985 | Gockel | 252/8.5 LC |
| 4,502,540 A | 3/1985 | Byham | |
| 4,506,734 A | 3/1985 | Nolte | |
| 4,521,316 A | 6/1985 | Sikorski | |
| 4,526,695 A | 7/1985 | Erbstoesser et al. | 252/8.55 R |
| 4,527,628 A | 7/1985 | Dill et al. | 166/295 |
| 4,632,876 A | 12/1986 | Laird et al. | |
| 4,694,905 A | 9/1987 | Armbruster | 166/280 |
| 4,715,967 A | 12/1987 | Bellis et al. | 252/8.551 |
| 4,716,964 A | 1/1988 | Erbstoesser et al. | 166/284 |
| 4,767,706 A | 8/1988 | Levesque | |
| 4,772,346 A | 9/1988 | Anderson et al. | |
| 4,785,884 A | 11/1988 | Armbruster | 166/280 |
| 4,793,416 A | 12/1988 | Mitchell | |
| 4,797,262 A | 1/1989 | Dewitz | 422/142 |
| 4,809,783 A | 3/1989 | Hollenbeck et al. | 166/307 |
| 4,817,721 A | 4/1989 | Pober | 166/295 |
| 4,822,500 A | 4/1989 | Dobson, Jr. et al. | |
| 4,829,100 A | 5/1989 | Murphey et al. | |
| 4,836,940 A | 6/1989 | Alexander | |
| 4,843,118 A | 6/1989 | Lai et al. | 524/555 |
| 4,848,467 A | 7/1989 | Cantu et al. | 166/281 |
| 4,863,980 A | 9/1989 | Cowan et al. | |
| 4,886,354 A | 12/1989 | Welch et al. | 356/70 |
| 4,894,231 A | 1/1990 | Moreau et al. | |
| 4,957,165 A | 9/1990 | Cantu et al. | 166/295 |
| 4,961,466 A | 10/1990 | Himes et al. | 166/250 |
| 4,986,353 A | 1/1991 | Clark et al. | 166/279 |
| 4,986,354 A | 1/1991 | Cantu et al. | 166/279 |
| 4,986,355 A | 1/1991 | Casad et al. | 166/295 |
| 5,034,139 A | 7/1991 | Reid et al. | |
| 5,082,056 A | 1/1992 | Tackett, Jr. | 166/295 |
| 5,142,023 A | 8/1992 | Gruber et al. | 528/354 |
| 5,152,781 A | 10/1992 | Tang et al. | |
| 5,161,615 A | 11/1992 | Hutchins et al. | |
| 5,203,834 A | 4/1993 | Hutchins et al. | |
| 5,213,446 A | 5/1993 | Dovan | |
| 5,216,050 A | 6/1993 | Sinclair | 524/108 |
| 5,247,059 A | 9/1993 | Gruber et al. | 528/354 |
| 5,249,628 A | 10/1993 | Surjaatmadia | 166/305 |
| 5,251,697 A | 10/1993 | Shuler | |
| 5,295,542 A | 3/1994 | Cole et al. | 166/278 |
| 5,304,620 A | 4/1994 | Holtmyer et al. | |
| 5,314,031 A | 5/1994 | Hale et al. | |
| 5,325,923 A | 7/1994 | Surjaatmadja et al. | 166/308 |
| 5,330,005 A | 7/1994 | Card et al. | 166/280 |
| 5,359,026 A | 10/1994 | Gruber | 528/354 |
| 5,360,068 A | 11/1994 | Sprunt et al. | 166/259 |
| 5,363,916 A | 11/1994 | Himes et al. | 166/276 |
| 5,373,901 A | 12/1994 | Norman et al. | 166/300 |
| 5,386,874 A | 2/1995 | Laramay et al. | 166/300 |
| 5,396,957 A | 3/1995 | Surjaatmadja et al. | 166/308 |
| 5,402,846 A | 4/1995 | Jennings, Jr. et al. | 166/259 |
| 5,439,055 A | 8/1995 | Card et al. | 166/280 |
| 5,460,226 A | 10/1995 | Lawson et al. | 166/300 |
| 5,464,060 A | 11/1995 | Hale et al. | 166/293 |
| 5,475,080 A | 12/1995 | Gruber et al. | 528/354 |
| 5,484,881 A | 1/1996 | Gruber et al. | 528/354 |
| 5,487,897 A | 1/1996 | Polson et al. | |
| 5,492,177 A | 2/1996 | Yeh et al. | |
| 5,496,557 A | 3/1996 | Feijen et al. | |
| 5,497,830 A | 3/1996 | Boles et al. | 166/300 |
| 5,499,678 A | 3/1996 | Surjaatmadja et al. | 166/298 |
| 5,501,276 A | 3/1996 | Weaver et al. | |
| 5,505,787 A | 4/1996 | Yamaguchi | 134/4 |
| 5,512,071 A | 4/1996 | Yam et al. | 51/307 |
| 5,536,807 A | 7/1996 | Gruber et al. | 528/354 |
| 5,555,936 A | 9/1996 | Pirri et al. | |
| 5,591,700 A | 1/1997 | Harris et al. | 507/204 |
| 5,594,095 A | 1/1997 | Gruber et al. | 528/354 |
| 5,602,083 A | 2/1997 | Gabrysch et al. | |
| 5,604,186 A | 2/1997 | Hunt et al. | 507/204 |
| 5,607,905 A | 3/1997 | Dobson, Jr. et al. | 507/211 |
| 5,613,558 A | 3/1997 | Dillenbeck | |
| 5,670,473 A | 9/1997 | Scepanski | 510/445 |
| 5,697,440 A | 12/1997 | Weaver et al. | |
| 5,698,322 A | 12/1997 | Tsai et al. | 428/373 |
| 5,723,416 A | 3/1998 | Liao | |
| 5,765,642 A | 6/1998 | Surjaatmadja | 166/297 |
| 5,783,527 A | 7/1998 | Dobson, Jr. et al. | |
| 5,791,415 A | 8/1998 | Nguyen et al. | 166/280 |
| 5,799,734 A | 9/1998 | Norman et al. | |
| 5,833,000 A | 11/1998 | Weaver et al. | 166/276 |
| 5,849,401 A | 12/1998 | El-Afandi et al. | 428/215 |
| 5,853,048 A | 12/1998 | Weaver et al. | 166/279 |
| 5,893,416 A | 4/1999 | Read | 166/304 |
| 5,908,073 A | 6/1999 | Nguyen et al. | 166/276 |
| 5,916,849 A | 6/1999 | House | |
| 5,924,488 A | 7/1999 | Nguyen et al. | 166/280 |
| 5,964,291 A | 10/1999 | Bourne et al. | 166/279 |
| 5,977,030 A | 11/1999 | House | |
| 5,979,557 A | 11/1999 | Card et al. | |
| 5,996,693 A | 12/1999 | Heathman | |
| 6,004,400 A | 12/1999 | Bishop et al. | 134/2 |
| 6,024,170 A | 2/2000 | McCabe et al. | 166/300 |
| 6,028,113 A | 2/2000 | Scepanski | 514/643 |
| 6,047,772 A | 4/2000 | Weaver et al. | 166/276 |
| 6,110,875 A | 8/2000 | Tjon-Joe-Pin et al. | |
| 6,114,410 A | 9/2000 | Betzold | 523/130 |
| 6,123,159 A | 9/2000 | Brookey et al. | |
| 6,123,965 A | 9/2000 | Jacob et al. | 424/489 |
| 6,131,661 A | 10/2000 | Conner et al. | 166/300 |
| 6,135,987 A | 10/2000 | Tsai et al. | 604/365 |
| 6,143,698 A | 11/2000 | Murphey et al. | 507/145 |
| 6,148,917 A | 11/2000 | Brookey et al. | |
| 6,162,766 A | 12/2000 | Muir et al. | 507/267 |
| 6,169,058 B1 | 1/2001 | Le et al. | 507/222 |
| 6,172,011 B1 | 1/2001 | Card et al. | 507/204 |
| 6,189,615 B1 | 2/2001 | Sydansk | 166/270 |
| 6,202,751 B1 | 3/2001 | Chatterji et al. | 166/276 |
| 6,209,643 B1 | 4/2001 | Nguyen et al. | 166/276 |
| 6,209,646 B1 | 4/2001 | Reddy et al. | 166/300 |
| 6,214,773 B1 | 4/2001 | Harris et al. | 507/271 |
| 6,242,390 B1 | 6/2001 | Mitchell et al. | 507/211 |
| 6,260,622 B1 | 7/2001 | Blok et al. | 166/305.1 |
| 6,291,013 B1 | 9/2001 | Gibson et al. | |
| 6,300,286 B1 | 10/2001 | Dobson, Jr. et al. | |
| 6,302,209 B1 | 10/2001 | Thompson et al. | |
| 6,308,788 B1 | 10/2001 | Patel et al. | |
| 6,311,773 B1 | 11/2001 | Todd et al. | 166/280 |
| 6,323,307 B1 | 11/2001 | Bigg et al. | 528/354 |
| 6,326,458 B1 | 12/2001 | Gruber et al. | 528/354 |
| 6,328,105 B1 | 12/2001 | Betzold | 166/280 |
| 6,330,917 B2 | 12/2001 | Chatterji et al. | |
| 6,357,527 B1 | 3/2002 | Norman et al. | 166/300 |
| 6,364,945 B1 | 4/2002 | Chatterji et al. | 106/677 |
| 6,367,548 B1 | 4/2002 | Purvis et al. | 166/281 |
| 6,380,138 B1 | 4/2002 | Ischy et al. | 507/204 |
| 6,387,986 B1 | 5/2002 | Moradi-Araghi et al. | 523/211 |
| 6,390,195 B1 | 5/2002 | Nguyen et al. | 166/276 |
| 6,394,185 B1 | 5/2002 | Constien | 166/296 |
| 6,422,314 B1 | 7/2002 | Todd et al. | 166/312 |
| 6,422,326 B1 | 7/2002 | Brookey et al. | |
| 6,432,155 B1 | 8/2002 | Swazey et al. | |
| 6,454,003 B1 | 9/2002 | Chang et al. | 166/270 |
| 6,485,947 B1 | 11/2002 | Rajgarhia et al. | 435/139 |

| | | | | | | |
|---|---|---|---|---|---|---|
| 6,488,763 B2 | 12/2002 | Brothers et al. ............... 106/692 | | 2002/0119169 A1 | 8/2002 | Angel et al. |
| 6,494,263 B2 | 12/2002 | Todd ........................ 166/312 | | 2002/0125012 A1 | 9/2002 | Dawson et al. ............... 166/300 |
| 6,508,305 B1 | 1/2003 | Brannon et al. ............... 166/293 | | 2002/0189810 A1 | 12/2002 | DiLullo et al. ............... 166/294 |
| 6,509,301 B1 | 1/2003 | Vollmer et al. | | 2003/0054962 A1 | 3/2003 | England et al. |
| 6,527,051 B1 | 3/2003 | Reddy et al. ............... 166/300 | | 2003/0060374 A1 | 3/2003 | Cooke, Jr. ................ 507/200 |
| 6,554,071 B1 | 4/2003 | Reddy et al. ............... 166/293 | | 2003/0114314 A1 | 6/2003 | Ballard et al. ............... 507/100 |
| 6,566,310 B2 | 5/2003 | Chan | | 2003/0130133 A1 | 7/2003 | Vollmer ...................... 507/100 |
| 6,569,814 B1 | 5/2003 | Brady et al. ............... 807/201 | | 2003/0147965 A1 | 8/2003 | Bassett et al. |
| 6,578,630 B2 | 6/2003 | Simpson et al. | | 2003/0188766 A1 | 10/2003 | Banerjee et al. ............... 134/7 |
| 6,599,863 B1 | 7/2003 | Palmer et al. ............... 507/219 | | 2003/0230407 A1 | 12/2003 | Vijn et al. |
| 6,667,279 B1 | 12/2003 | Hessert et al. ............... 507/225 | | 2003/0234103 A1 | 12/2003 | Lee et al. ................. 166/293 |
| 6,669,771 B2 | 12/2003 | Tokiwa et al. ............... 106/162.7 | | 2004/0014606 A1 | 1/2004 | Parlar et al. |
| 6,681,856 B1 | 1/2004 | Chatterji et al. ............... 166/294 | | 2004/0014607 A1 | 1/2004 | Sinclair et al. ............... 507/200 |
| 6,686,328 B1 | 2/2004 | Binder ........................ 510/446 | | 2004/0040706 A1 | 3/2004 | Hossaini et al. ............... 166/278 |
| 6,691,780 B2 | 2/2004 | Nguyen et al. | | 2004/0055747 A1 | 3/2004 | Lee ............................. 166/278 |
| 6,702,023 B1 | 3/2004 | Harris et al. ................ 166/307 | | 2004/0070093 A1 | 4/2004 | Mathiowitz et al. |
| 6,710,019 B1 | 3/2004 | Sawdon et al. ............... 507/136 | | 2004/0094300 A1 | 5/2004 | Sullivan et al. ........... 166/308.1 |
| 6,716,797 B2 | 4/2004 | Brookey | | 2004/0099416 A1 | 5/2004 | Vijn et al. |
| 6,737,385 B2 | 5/2004 | Todd et al. | | 2004/0106525 A1 | 6/2004 | Willbert et al. ............... 507/200 |
| 6,761,218 B2 | 7/2004 | Nguyen et al. ............... 166/278 | | 2004/0138068 A1 | 7/2004 | Rimmer et al. ............... 507/100 |
| 6,763,888 B1 | 7/2004 | Harris et al. ............. 166/305.1 | | 2004/0152601 A1 | 8/2004 | Still et al. ................... 507/100 |
| 6,764,981 B1 | 7/2004 | Eoff et al. | | 2004/0152602 A1 | 8/2004 | Boles ........................ 507/100 |
| 6,793,018 B2 | 9/2004 | Dawson et al. | | 2004/0162386 A1 | 8/2004 | Altes et al. |
| 6,793,730 B2 | 9/2004 | Reddy et al. | | 2004/0170836 A1 | 9/2004 | Bond et al. |
| 6,806,235 B1 | 10/2004 | Mueller et al. | | 2004/0214724 A1 | 10/2004 | Todd et al. |
| 6,817,414 B2 | 11/2004 | Lee ............................. 166/278 | | 2004/0216876 A1 | 11/2004 | Lee ........................ 166/280.1 |
| 6,818,594 B1 | 11/2004 | Freeman et al. | | 2004/0231845 A1 | 11/2004 | Cooke, Jr. ................... 166/279 |
| 6,837,309 B2 | 1/2005 | Boney et al. ............... 166/280.2 | | 2004/0261993 A1 | 12/2004 | Nguyen ...................... 166/276 |
| 6,883,608 B2 | 4/2005 | Parlar et al. | | 2004/0261995 A1 | 12/2004 | Nguyen et al. ............... 166/279 |
| 6,896,058 B2 | 5/2005 | Munoz, Jr. et al. ........... 166/279 | | 2004/0261996 A1 | 12/2004 | Munoz, Jr. et al. ........... 166/279 |
| 6,904,971 B2 | 6/2005 | Brothers et al. | | 2004/0261999 A1 | 12/2004 | Nguyen ...................... 166/292 |
| 6,949,491 B2 * | 9/2005 | Cooke, Jr. ................. 507/219 | | 2005/0006095 A1 | 1/2005 | Justus et al. ................ 166/295 |
| 6,959,767 B2 | 11/2005 | Horton et al. | | 2005/0028976 A1 | 2/2005 | Nguyen ...................... 166/276 |
| 6,978,838 B2 | 12/2005 | Parlar et al. | | 2005/0034861 A1 | 2/2005 | Saini et al. ................... 166/278 |
| 6,981,552 B2 | 1/2006 | Reddy et al. | | 2005/0034865 A1 | 2/2005 | Todd et al. ................... 166/304 |
| 6,987,083 B2 | 1/2006 | Phillippi et al. | | 2005/0034868 A1 | 2/2005 | Frost et al. ................... 166/307 |
| 6,997,259 B2 | 2/2006 | Nguyen | | 2005/0059556 A1 | 3/2005 | Munoz, Jr. et al. |
| 7,007,752 B2 | 3/2006 | Reddy et al. | | 2005/0059557 A1 | 3/2005 | Todd et al. |
| 7,021,377 B2 | 4/2006 | Todd et al. | | 2005/0059558 A1 | 3/2005 | Blauch et al. |
| 7,032,663 B2 | 4/2006 | Nguyen | | 2005/0103496 A1 | 5/2005 | Todd et al. ................... 166/278 |
| 7,036,586 B2 | 5/2006 | Roddy et al. | | 2005/0126785 A1 | 6/2005 | Todd ........................ 166/307 |
| 7,036,587 B2 | 5/2006 | Munoz, Jr. et al. | | 2005/0130848 A1 | 6/2005 | Todd et al. |
| 7,044,220 B2 * | 5/2006 | Nguyen et al. ........... 166/280.2 | | 2005/0183741 A1 | 8/2005 | Surjaatmadja et al. |
| 7,044,224 B2 | 5/2006 | Nguyen | | 2005/0205266 A1 | 9/2005 | Todd et al. |
| 7,063,151 B2 | 6/2006 | Nguyen et al. | | 2005/0252659 A1 | 11/2005 | Sullivan et al. ........... 166/280.1 |
| 7,066,258 B2 | 6/2006 | Justus et al. | | 2005/0272613 A1 | 12/2005 | Cooke, Jr. ................... 507/219 |
| 7,069,994 B2 | 7/2006 | Cooke, Jr. | | 2005/0277554 A1 | 12/2005 | Blauch et al. |
| 7,080,688 B2 | 7/2006 | Todd et al. ................... 166/278 | | 2006/0016596 A1 | 1/2006 | Pauls et al. |
| 7,093,664 B2 | 8/2006 | Todd et al. | | 2006/0032633 A1 | 2/2006 | Nguyen |
| 7,096,947 B2 | 8/2006 | Todd et al. | | 2006/0046938 A1 | 3/2006 | Harris et al. |
| 7,101,829 B2 | 9/2006 | Guichard et al. | | 2006/0048938 A1 | 3/2006 | Kalman |
| 7,131,491 B2 | 11/2006 | Blauch et al. | | 2006/0065397 A1 | 3/2006 | Nguyen et al. |
| 7,140,438 B2 | 11/2006 | Frost et al. | | 2006/0105917 A1 | 5/2006 | Munoz, Jr. ................... 507/103 |
| 7,147,067 B2 | 12/2006 | Getzlaf et al. | | 2006/0105918 A1 | 5/2006 | Munoz, Jr. et al. |
| 7,151,077 B2 | 12/2006 | Prud'homme et al. | | 2006/0169182 A1 | 8/2006 | Todd et al. |
| 7,156,174 B2 | 1/2007 | Roddy et al. | | 2006/0169450 A1 | 8/2006 | Mang et al. |
| 7,165,617 B2 | 1/2007 | Lord et al. | | 2006/0172891 A1 | 8/2006 | Todd et al. |
| 7,168,489 B2 | 1/2007 | Frost et al. | | 2006/0172894 A1 | 8/2006 | Mang et al. |
| 7,172,022 B2 | 2/2007 | Reddy et al. | | 2006/0172895 A1 | 8/2006 | Mang et al. |
| 7,178,596 B2 | 2/2007 | Blauch et al. ................ 166/280 | | 2006/0185847 A1 | 8/2006 | Saini et al. |
| 7,195,068 B2 | 3/2007 | Todd | | 2006/0185848 A1 | 8/2006 | Surjaatmadja et al. |
| 7,204,312 B2 | 4/2007 | Roddy et al. | | 2006/0283597 A1 | 12/2006 | Schriener et al. ............. 166/300 |
| 7,219,731 B2 | 5/2007 | Sullivan | | | | |
| 7,228,904 B2 | 6/2007 | Todd et al. | | | FOREIGN PATENT DOCUMENTS | |
| 7,256,159 B2 | 8/2007 | Guichard et al. | | | | |
| 7,261,156 B2 | 8/2007 | Nguyen et al. | | EP | 0 879 935 A2 | 11/1998 |
| 7,264,051 B2 | 9/2007 | Nguyen et al. | | EP | 0 879 935 A3 | 10/1999 |
| 7,267,170 B2 | 9/2007 | Mang et al. | | EP | WO 03/027431 A2 | 4/2003 |
| 7,303,014 B2 | 12/2007 | Reddy et al. | | EP | 1 413 710 A1 | 4/2004 |
| 7,306,037 B2 | 12/2007 | Nguyen et al. | | GB | 2 412 389 | 3/2004 |
| 7,322,412 B2 | 1/2008 | Badalamenti et al. | | WO | WO 93/15127 A1 | 8/1993 |
| 2001/0016562 A1 | 8/2001 | Muir et al. ................... 507/201 | | WO | WO 94/07949 A1 | 4/1994 |
| 2002/0036088 A1 | 3/2002 | Todd ........................ 166/300 | | WO | WO 94/08078 A1 | 4/1994 |

| WO | WO 94/08090 A1 | 4/1994 |
| WO | WO 95/09879 A1 | 4/1995 |
| WO | WO 97/11845 A1 | 4/1997 |
| WO | WO 99/27229 | 6/1999 |
| WO | WO 00/57022 | 9/2000 |
| WO | WO 01/02698 | 1/2001 |
| WO | WO 01/87797 A1 | 11/2001 |
| WO | WO 01/94744 | 12/2001 |
| WO | WO 02/055843 A1 | 1/2002 |
| WO | WO 02/12674 A1 | 2/2002 |
| WO | WO 03/027431 A2 | 4/2003 |
| WO | WO 03/027431 A3 | 4/2003 |
| WO | WO 2004/007905 | 1/2004 |
| WO | WO 2004/037946 A1 | 5/2004 |
| WO | WO 2004/038176 A1 | 5/2004 |

OTHER PUBLICATIONS

Cordes, et al., *Mechanism and Catalysis for Hydrolysis of Acetals, Ketals, and Other Esters*, Department of Chemistry, Indiana University, Bloomington, Indiana, Chemical Reviews, 1974, vol. 74, No. 5, pp. 581-603.

Todd, et al., *A Chemical "Trigger" Useful for Oilfield Applications*, Society of Petroleum Engineers, Inc., SPE 92709, Feb. 4, 2005.

Skrabal et al., *The Hydrolysis Rate of Orthoformic Acid Ethyl Ether*, Chemical Institute of the University of Graz, pp. 1-38, Jan. 13, 1921.

Heller, et al., *Poly(ortho esters)—From Concept To Reality*, Biomacromolecules, vol. 5, No. 5, 2004 (pp. 1625-1632), May 9, 1979.

Schwach-Abdellaoui, et al., *Hydrolysis and Erosion Studies of Autocatalyzed Poly(ortho esters) Containing Lactoyl-Lactyl Acid Dimers*, American Chemical Society, vol. 32, No. 2, 1999 (pp. 301-307).

Ng, et al., *Synthesis and Erosion Studies of Self-Catalyzed Poly(ortho ester)s*, American Chemical Society, vol. 30, No. 4, 1997 (pp. 770-772).

Ng, et al., *Development Of A Poly(ortho ester) prototype With A Latent Acid In The Polymer Backbone For 5-fluorouracil Delivery*, Journal of Controlled Release 65 (2000), pp. 367-374.

Rothen-Weinhold, et al., *Release of BSA from poly(ortho ester) extruded thin strands*, Journal of Controlled Release 71, 2001, (pp. 31-37).

Heller, et al., *Poly(ortho ester)s—their development and some recent applications*, European Journal of Pharmaceutics and Biopharmaceutics, 50, 2000, (pp. 121-128).

Heller, et al., *Poly(ortho esters); synthesis, characterization, properties and uses*, Advanced Drug Delivery Reviews, 54, 2002, (pp. 1015-1039).

Heller, et al., *Poly(ortho esters) For The Pulsed And Continuous Delivery of Peptides And Proteins*, Controlled Release and Biomedical Polymers Department, SRI International, (pp. 39-46).

Zignani, et al., *Subconjunctival biocompatibility of a viscous bioerodable poly(ortho ester)*, J. Biomed Mater Res, 39, 1998, pp. 277-285.

Toncheva, et al., *Use of Block Copolymers of Poly(Ortho Esters) and Poly (Ethylene Glycol)*, Journal of Drug Targeting, 2003, vol. 11(6), pp. 345-353.

Schwach-Abdellaoui, et al., *Control of Molecular Weight For Auto-Catalyzed Poly(ortho ester) Obtained by Polycondensation Reaction*, International Journal of Polymer Anal. Charact., 7: 145-161, 2002, pp. 145-161.

Heller, et al., *Release of Norethindrone from Poly(Ortho Esters)*, Polymer Engineering and Science, Mid-Aug. 1981, vol. 21, No. 11 (pp. 727-731).

Y. Chiang et al.: "Hydrolysis of Otho Esters: Further Investigation of the Factors Which Control the Rate-Determining Step," Engineering Information Inc., NY, NY, vol. 105, No. 23 (XP-002322842), Nov. 16, 1983.

M. Ahmad, et al.: "Ortho Ester Hydrolysis: Direct Evidence for a Three-Stage Reaction Mechanism,"Engineering Information Inc., NY, NY, vol. 101, No. 10 (XP-002322843), May 9, 1979.

Simmons, et al., *Poly(phenyllactide): Synthesis, Characterization, and Hydrolytic Degradation*, Biomacromolecules, vol. 2, No. 2, 2001 (pp. 658-663).

Yin, et al., *Preparation and Characterization of Substituted Polylactides*, American Chemical Society, vol. 32, No. 23, 1999 (pp. 7711-7718).

Yin, et al., *Synthesis and Properties of Polymers Derived form Substituted Lactic Acids*, American Chemical Society, Ch. 12, 2001 (pp. 147-159).

Cantu, et al, *Laboratory and Field Evaluation of a Combined Fluid-Loss-Control Additive and Gel Breaker for Fracturing Fluids*, SPE 18211, Society of Petroleum Engineers, 1990.

Love, et al, *Selectively Placing Many Fractures in Openhole Horizontal Wells Improves Production*, SPE 50422, Society of Petroleum Engineers, 1998.

McDaniel, et al, *Evolving New Stimulation Process Proves Highly Effective in Level 1 Dual-Lateral Completion*, SPE 78697, Society of Petroleum Engineers, 2002.

Albertsson, et al, *Aliphatic Polyesters: Systhesis, Properties and Applications*, Advances in Polymer Science, vol. 157, Degradable Aliphatic Polyesters, 2002.

Dechy-Cabaret, et al, *Controlled Ring-Opening Polymerization of Lactide and Glycolide*, American Chemical Society, Chemical Reviews, A-Z, AA-AD.

Funkhouser, et al, *Synthetic Polymer Fracturing Fluid for High-Temperature Applications*, SPE 80236, Society of Petroleum Engineers, 2003.

*Chelating Agents*, Encyclopedia of Chemical Technology, vol. 5, (764-795).

Vichaibun, et al, *A New Assay for the Enzymatic Degradation of Polylactic Acid*, Short Report, ScienceAsia, vol. 29, 2003 (pp. 297-300).

Halliburton, *SurgiFrac$^{SM}$ Service, A Quick and Cost-Effective Method to Help Boost Production From Openhole Horizontal Completions*, Halliburton Communications, HO3297, 2002.

Halliburton, *Cobra Frac$^{SM}$ Serivce, Coiled Tubing Fracturing—Cost-Effective Method for Stimulating Untapped Reserves*, HO2319R, Halliburton Energy Services, 2000.

Halliburton, *CobraJet Frac$^{SM}$ Service, Cost-effective Technology That Can Help Reduce Cost Per BOE Produced, Shorten Cycle Time and Reduce Capex*, Halliburton Communications.

Technical Brochure, "SurgiFrac Service—Fracture Stimulation Technique for Horizontal Completions in Low-to-Medium-Permeability Reservoirs", 2003.

* cited by examiner

FRACTURING FLUIDS COMPRISING DEGRADABLE DIVERTING AGENTS AND METHODS OF USE IN SUBTERRANEAN FORMATIONS

BACKGROUND OF THE INVENTION

The present invention relates to subterranean treatment operations. More particularly, the present invention relates to treatment fluids comprising degradable diverting agents and methods of using such treatment fluids in subterranean formations.

Hydrocarbon-producing wells often are stimulated by hydraulic fracturing operations, wherein a fracturing fluid may be introduced into a portion of a subterranean formation penetrated by a well bore at a hydraulic pressure sufficient to create or enhance at least one fracture therein. Often, particulate solids, such as graded sand, will be suspended in a portion of the fracturing fluid so that the proppant particles may be placed in the resultant fractures to maintain the integrity of the fractures (after the hydraulic pressure is released), thereby forming conductive channels within the formation through which hydrocarbons can flow. Once at least one fracture has been created and at least a portion of the proppant is substantially in place within the fracture, the viscosity of the fracturing fluid may be reduced to facilitate removal of the fracturing fluid from the formation.

In certain hydrocarbon-producing formations, much of the production may be derived from natural fractures. These natural fractures may exist in the reservoir prior to a fracturing operation, and, when contacted by an induced fracture (e.g., a fracture formed or enhanced during a fracturing treatment), may provide flow channels having a relatively high conductivity that may improve hydrocarbon production from the reservoir. However, fracturing treatments often may be problematic in naturally-fractured reservoirs, or in any other reservoirs where an existing fracture could intersect a created or enhanced fracture. In such situations, the intersection of the fractures could impart a highly tortuous shape to the created or enhanced fracture, which could result in, e.g., premature screenout. Additionally, the initiation of a fracturing treatment on a well bore intersected with multiple natural fractures may cause multiple fractures to be initiated, each having a relatively short length, which also could cause undesirable premature screenouts.

In an attempt to address these problems, fracturing fluids often are formulated to include diverting agents that may, inter alia, form a temporary plug in the perforations or natural fractures that tend to accept the greatest fluid flow, thereby diverting the remaining treatment fluid to generated fracture. However, conventional diverting agents may be difficult to remove completely from the subterranean formation, which may cause a residue to remain in the well bore area following the fracturing operation, which may permanently reduce the permeability of the formation. In some cases, difficulty in removing conventional diverting agents from the formation may permanently reduce the permeability of the formation by between 5% to 40%, and may even cause a 100% permanent reduction in permeability in some instances.

SUMMARY OF THE INVENTION

The present invention relates to subterranean treatment operations. More particularly, the present invention relates to treatment fluids comprising degradable diverting agents and methods of using such treatment fluids in subterranean formations.

An example of a method of the present invention is a method of fracturing a subterranean formation, comprising: providing a fracturing fluid comprising a degradable diverting agent; introducing the fracturing fluid into a subterranean formation at a pressure sufficient to create or enhance at least one fracture therein; and permitting the degradable diverting agent to degrade.

Another example of a method of the present invention is a method of fracturing a subterranean formation comprising: positioning a hydrojetting tool having at least one fluid jet forming nozzle in a portion of the subterranean formation to be fractured; jetting a fracturing fluid comprising a degradable diverting agent through the at least one fluid jet forming nozzle against the formation at a pressure sufficient to form a cavity in the formation; further jetting the fracturing fluid through the nozzle to create or enhance at least one fracture in the formation; and permitting the degradable diverting agent to degrade.

Another example of a method of the present invention is a method of enhancing production from multiple regions of a subterranean formation penetrated by a well bore during a single trip through the well bore, comprising: positioning a hydrojetting tool having at least one fluid jet forming nozzle in a region of the subterranean formation to be fractured; jetting a fluid through the at least one fluid jet forming nozzle against the formation at a pressure sufficient to create at least one fracture in the formation; pumping a fluid comprising a degradable diverting agent into an annulus between the hydrojetting tool and the formation at a rate sufficient to raise the annular pressure to a level sufficient to extend the fracture into the formation; repositioning the hydrojetting tool in a different region of the formation; repeating jetting a fluid through the at least one fluid jet forming nozzle against the formation at a pressure sufficient to create at least one fracture in the formation and pumping a fluid comprising a degradable diverting agent into the annulus between the hydrojetting tool and the formation at a rate sufficient to raise the annular pressure to a level sufficient to extend the fracture into the formation; and permitting the degradable diverting agent to degrade.

The features and advantages of the present invention will be readily apparent to those skilled in the art upon a reading of the description of the preferred embodiments that follows.

DETAILED DESCRIPTION OF EMBODIMENTS

Figure 1:
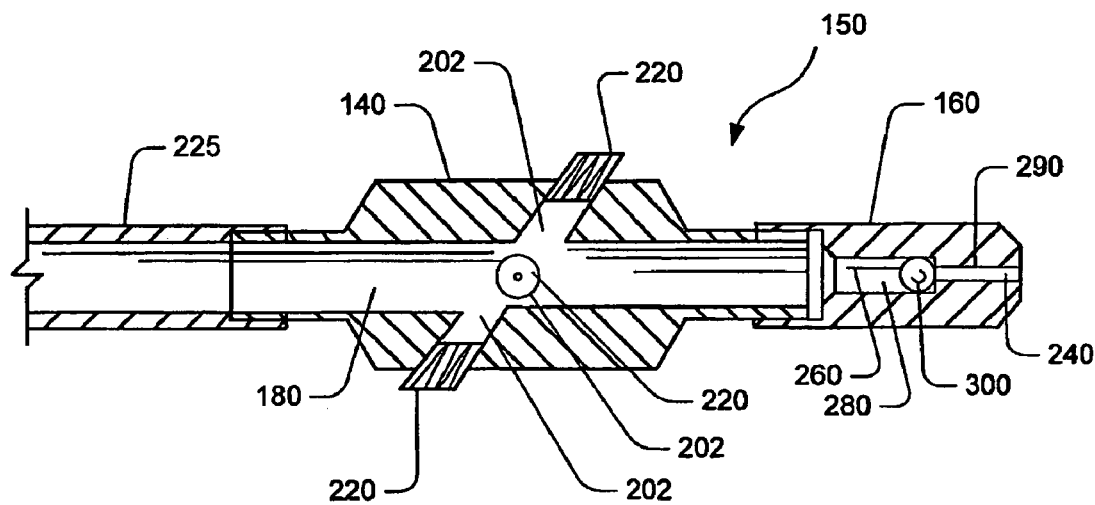
FIG. 1 shows a cross sectional view of a hydrojetting tool.

The present invention relates to subterranean treatment operations. More particularly, the present invention relates to treatment fluids comprising degradable diverting agents and methods of using such treatment fluids in subterranean formations. The treatment fluids comprising degradable diverting agents are suitable for use in, inter alia, hydraulic fracturing and frac-packing applications. According to certain embodiments of the methods of the present invention, a treatment fluid may be flowed through a subterranean formation as part of a subterranean treatment operation (e.g., hydraulic fracturing, and the like), and the degradable diverting agents described herein desirably may bridge or obstruct pore throats in smaller fractures that may be perpendicular to the one or more dominant fractures being formed in the formation. Among other things, this may provide additional flow capacity that may facilitate extending one or more dominant fractures in the formation. Moreover, according to certain embodiments of the methods of the present invention, the degradable nature of the degradable diverting agents described herein may facilitate increased hydrocarbon production from the formation after the conclusion of the subterranean treatment operation, inter alia, because the degradation of the degradable diverting agents may enhance flow of hydrocarbons from the formation into the one or more dominant fractures, from which point the hydrocarbons may flow to the well bore and then to the surface, where they may be produced.

The treatment fluids used in the methods of the present invention generally comprise a base fluid and a degradable diverting agent.

The treatment fluids used in the methods of the present invention comprise a degradable diverting agent that is capable of undergoing an irreversible degradation downhole. As referred to herein, the term "irreversible" will be understood to mean that the degradable diverting agent, once degraded downhole, should not reconstitute while downhole, e.g., the degradable diverting agent should degrade in situ but should not reconstitute in situ. The terms "degradation" or "degradable" refer to both the two relatively extreme cases of hydrolytic degradation that the degradable diverting agent may undergo, e.g., bulk erosion and surface erosion, and any stage of degradation in between these two. This degradation can be a result of, inter alia, a chemical reaction, a thermal reaction, or a reaction induced by radiation.

In certain embodiments of the present invention, the degradable diverting agent may be in particulate form. In certain embodiments of the present invention, the degradable diverting agent may have a particle size distribution in the range of from about 0.1 micron to about 1.0 millimeter. In certain embodiments of the present invention, the degradable diverting agent may have a particle size distribution in the range of from about 1 micron to about 300 microns, or from about 1 micron to about 200 microns, or from about 1 micron to about 30 microns. Certain embodiments of the treatment fluids used in the methods of the present invention may comprise degradable diverting agents having a broader particle size distribution, or a narrower particle size distribution. The selection of a suitable particle size distribution for the degradable diverting agent may depend on factors such as, inter alia, permeability of the formation, the type of formation, the extent of the angle between the natural fractures and man-made fractures, the size of the orifices in the jetting tool to be used, and the like. One of ordinary skill in the art, with the benefit of this disclosure, will be able to identify a suitable particle size distribution for the degradable diverting agent for a particular application.

The degradable diverting agent may be present in the treatment fluids used in the methods of the present invention in an amount sufficient to provide a desired amount of fluid loss control. In certain embodiments, the degradable diverting agent may be present in the treatment fluids used in the methods of the present invention in an amount in the range of from about 0.1% to about 10% by weight of the treatment fluid. In certain embodiments, the degradable diverting agent may be present in the treatment fluids in an amount in the range of from about 0.2% to about 0.5% by weight of the treatment fluid. In certain embodiments, the degradable diverting agent may provide the treatment fluids with the desired amount of fluid loss control by, inter alia, bridging or obstructing pore throats in the subterranean formation.

Generally, the degradable diverting agents in the treatment fluids may degrade over time, to facilitate hydrocarbon production from the formation after the conclusion of the treatment operation. In certain embodiments, the degradable diverting agent may degrade slowly over time, as opposed to instantaneously. The time required for degradation of the degradable diverting agent may depend on factors including, but not limited to, the temperature to which the degradable diverting agent is exposed, as well as the type of degradable diverting agent used. In certain embodiments, the treatment fluids used in the methods of the present invention may comprise a degradable diverting agent that does not begin to degrade until at least about 12 to about 96 hours after its placement in the subterranean formation. In certain embodiments, the treatment fluids may comprise a degradable diverting agent that does not begin to degrade until at least about 12 to about 24 hours after its placement in the subterranean formation. Certain embodiments of the treatment fluids may comprise degradable diverting agents that may begin degrading in less than about 12 hours, or that may not begin degrading until greater than about 96 hours.

The degradable diverting agents used in the methods of the present invention may be made from a variety of degradable materials. In certain embodiments of the present invention, the degradable material comprises a degradable polymer. In certain embodiments of the present invention, the degradable material comprises a combination of a degradable polymers and a hydrated organic or inorganic compounds. Examples of suitable hydrated organic or inorganic compounds include, but are not limited to, sodium acetate trihydrate, L-tartaric acid disodium salt dihydrate, sodium citrate dihydrate, sodium carbonate decahydrate, sodium borate decahydrate, sodium tetraborate decahydrate, sodium hydrogen phosphate heptahydrate, sodium phosphate dodecahydrate, amylose, starch-based hydrophilic polymers, or cellulose-based hydrophilic polymers. In choosing the appropriate degradable material, one should consider the degradation products that will result. Also, these degradation products should not adversely affect other operations or components. One of ordinary skill in the art, with the benefit of this disclosure, will be able to recognize when potential components of the treatment fluids of the present invention would be incompatible or would produce degradation products that would adversely affect other operations or components.

As for degradable polymers, a polymer is considered to be "degradable" herein if the degradation is due to, inter alia, chemical and/or radical process such as hydrolysis, oxidation, enzymatic degradation, or UV radiation. The degradability of a polymer depends, at least in part, on its backbone structure. For instance, the presence of hydrolyzable and/or oxidizable linkages in the backbone often yields a material that will degrade as described herein. The rates at which such polymers degrade are dependent on, inter alia, the type of repetitive unit, composition, sequence, length, molecular geometry, molecular weight, morphology (e.g., crystallinity, size of spherulites, and orientation), hydrophilicity, hydrophobicity, surface area, and additives. Also, the environment to which the polymer is subjected may affect how the polymer degrades, e.g., temperature, presence of moisture, oxygen, microorganisms, enzymes, pH, and the like.

Suitable examples of degradable polymers that may be used in accordance with the present invention include, but are not limited to, those described in the publication of Advances in Polymer Science, Vol. 157 entitled "Degradable Aliphatic Polyesters" edited by A. C. Albertsson, pages 1-138. Specific examples include, but are not limited to, homopolymers, random, block, graft, and star- and hyper-branched aliphatic polyesters. Such suitable polymers may be prepared by polycondensation reactions, ring-opening polymerizations, free radical polymerizations, anionic polymerizations, carbocationic polymerizations, and coordinative ring-opening polymerization for, e.g., lactones, and any other suitable process. Specific examples of suitable polymers include, but are not limited to, polysaccharides such as dextran or cellulose; chitin; chitosan; proteins; orthoesters; aliphatic polyesters; poly(lactide); poly(glycolide); poly($\epsilon$-caprolactone); poly(hydroxybutyrate); poly(anhydrides); aliphatic polycarbonates; poly(orthoesters); poly(amino acids); poly(ethylene oxide); and polyphosphazenes. Of these suitable polymers, aliphatic polyesters and polyanhydrides may be preferred for some applications.

Aliphatic polyesters degrade chemically, inter alia, by hydrolytic cleavage. Hydrolysis can be catalyzed by either acids or bases. Generally, during the hydrolysis, carboxylic end groups are formed during chain scission, which may enhance the rate of further hydrolysis. This mechanism is known in the art as "autocatalysis," and is thought to make polymer matrices more bulk-eroding.

Suitable aliphatic polyesters have the general formula of repeating units shown below:

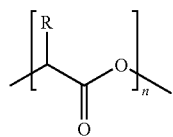

Formula I where n is an integer between 75 and 10,000 and R is selected from the group consisting of hydrogen, alkyl, aryl, alkylaryl, acetyl, heteroatoms, and mixtures thereof. In certain embodiments, the aliphatic polyester may be poly(lactide). Poly(lactide) may be synthesized either from lactic acid by a condensation reaction or, more commonly, by ring-opening polymerization of cyclic lactide monomer. Since both lactic acid and lactide can achieve the same repeating unit, the general term poly(lactic acid) as used herein refers to writ of formula I without any limitation as to how the polymer was made (such as from lactides, lactic acid, or oligomers), and without reference to the degree of polymerization or level of plasticization.

The lactide monomer exists generally in three different forms: two stereoisomers L- and D-lactide and racemic D,L-lactide (meso-lactide). The oligomers of lactic acid, and oligomers of lactide are defined by the formula:

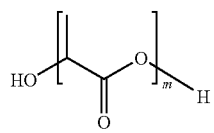

Formula II where m is an integer: $2 \leq m \leq 75$. In certain embodiments, m may be an integer: $2 \leq m \leq 10$. These limits correspond to number average molecular weights below about 5,400 and below about 720, respectively. The chirality of the lactide units provides a means to adjust, inter alia, degradation rates, as well as physical and mechanical properties. Poly(L-lactide), for instance, is a semicrystalline polymer with a relatively slow hydrolysis rate. This may be desirable, inter alia, in applications of the present invention where a slower degradation of the degradable material may be desired. Poly(D,L-lactide) may be a more amorphous polymer with a resultant faster hydrolysis rate, which may be suitable, inter alia, for other applications where a more rapid degradation may be appropriate. The stereoisomers of lactic acid may be used individually, or may be combined in accordance with the present invention. Additionally, they may be copolymerized with, for example, glycolide or other monomers like $\epsilon$-caprolactone, 1,5-dioxepan-2-one, trimethylene carbonate, or other suitable monomers to obtain polymers with different properties or degradation times. Additionally, the lactic acid stereoisomers can be modified by blending high and low molecular weight polylactide, or by blending polylactide with other polyesters.

Aliphatic polyesters useful in the present invention may be prepared by substantially any of the conventionally known manufacturing methods, including, but not limited to, those described in U.S. Pat. Nos. 6,323,307; 5,216,050; 4,387,769; 3,912,692; and 2,703,316, the relevant disclosures of which are incorporated herein by reference. In addition to the other qualities above, the plasticizers may enhance the degradation rate of the degradable polymeric materials.

Polyanhydrides are another type of particularly suitable degradable polymer that may be useful in the degradable diverting agents used in the methods of the present invention. Polyanhydride hydrolysis proceeds, inter alia, via free carboxylic acid chain-ends to yield carboxylic acids as final degradation products. The erosion time can be varied over a broad range of changes in the polymer backbone. Examples of suitable polyanhydrides include, but are not limited to, poly(adipic anhydride), poly(suberic anhydride), poly(sebacic anhydride), and poly(dodecanedioic anhydride). Other suitable examples include, but are not limited to, poly(maleic anhydride) and poly(benzoic anhydride).

The physical properties of degradable polymers may depend on several factors, including, inter alia, the composition of the repeat units, flexibility of the chain, presence of polar groups, molecular mass, degree of branching, crystallinity, and orientation. For example, short-chain branches may reduce the degree of crystallinity of polymers while long-chain branches may lower the melt viscosity and impart, inter alia, elongational viscosity with tension-stiffening behavior. The properties of the degradable material utilized further can be tailored by blending, and copolymerizing it with another polymer, or by changing the macromolecular architecture (e.g., hyper-branched polymers, star-shaped, or dendrimers). The properties of any such suitable degradable polymers (e.g., hydrophobicity, hydrophilicity, rate of degradation) can be tailored, inter alia, by introducing select functional groups along the polymer chains. For example, poly(phenyllactide) will degrade at about 1/5th of the rate of racemic poly(lactide) at a pH of 7.4 at 55° C. One of ordinary skill in the art, with the benefit of this disclosure, will be able to determine the appropriate functional groups to introduce to the polymer chains to achieve the desired physical properties of the degradable polymers.

The choice of degradable material for use in the degradable diverting agents used in the methods of the present invention may depend, at least in part, on the conditions of the well, e.g., well bore temperature. For instance, lactides have been found to be suitable for lower temperature wells, including those within the range of about 60° F. to about 150° F., and polylactides have been found to be suitable for well bore temperatures above this range.

The specific features of the degradable diverting agents used in the methods of the present invention may be modified so as to prevent loss of fluid to the formation. The degradable diverting agents may have any shape, including, but not limited to, particles having the physical shape of platelets, shavings, flakes, ribbons, rods, strips, spheroids, toroids, pellets, tablets, or any other physical shape. One of ordinary skill in the art, with the benefit of this disclosure, will recognize the specific degradable material that may be used in the degradable diverting agents, and the preferred size and shape for a given application.

A variety of base fluids may be included in the treatment fluids used in the methods of the present invention. For example, the base fluid may comprise water, acids, oils, or mixtures thereof. In certain embodiments of the present invention wherein the base fluid comprises water, the water used may be fresh water, salt water (e.g., water containing one or more salts dissolved therein), brine (e.g., saturated salt water), or seawater. Generally, the water may be from any source, provided that it does not contain an excess of compounds that may adversely affect other components in the treatment fluid. Examples of suitable acids include, but are not limited to, hydrochloric acid, acetic acid, formic acid, citric acid, or mixtures thereof. In certain embodiments, the base fluid may further comprise a gas (e.g., nitrogen, or carbon dioxide). Generally, the base fluid is present in the treatment fluids used in the methods of the present invention in an amount in the range of from about 25% to about 99% by weight of the treatment fluid.

Optionally, the treatment fluids used in the methods of the present invention may comprise a viscosifier. Examples of suitable viscosifiers include, inter alia, biopolymers such as xanthan and succinoglycan, cellulose derivatives (e.g., hydroxyethylcellulose), and guar and its derivatives (e.g., hydroxypropyl guar). In certain embodiments of the treatment fluids used in the methods of the present invention that comprise a viscosifier, the viscosifier comprises guar. More particularly, the viscosifier may be present in the treatment fluids in an amount in the range of from about 0.01% to about 1.0% by weight. In certain embodiments, the viscosifier may be present in the treatment fluids in an amount in the range of from about 0.2% to about 0.6% by weight.

Optionally, the treatment fluids used in the methods of the present invention may comprise additional additives as deemed appropriate by one skilled in the art, with the benefit of this disclosure. Examples of such additives include, but are not limited to, de-emulsifiers, surfactants, salts, crosslinking agents, buffers, clay inhibitors, iron-control additives, breakers, bactericides, caustic, relative permeability modifiers, or the like. An example of a suitable de-emulsifier is commercially available from Halliburton Energy Services, Inc., under the trade name "LO-SURF 300." An example of a suitable source of caustic is commercially available from Halliburton Energy Services, Inc., under the trade name "MO-67." An example of a suitable buffer comprises ammonium acetate and is commercially available from Halliburton Energy Services, Inc., under the trade name "BA-20." An example of a suitable crosslinking agent is commercially available from Halliburton Energy Services, Inc., under the trade name "CL-28M." An example of a suitable breaker is commercially available from Halliburton Energy Services, Inc., under the trade name "VICON NF." Examples of suitable bactericides are commercially available from Halliburton Energy Services, Inc., under the trade names "BE-3S" and "BE-6." An example of a suitable relative permeability modifier is commercially available from Halliburton Energy Services, Inc., under the trade name "KW FRAC FLUID."

Optionally, the treatment fluids used in the methods of the present invention may comprise proppant particulates. In certain optional embodiments of the present invention where proppant particulates are present, the proppant particulates generally are of a size such that formation fines that may migrate with produced fluids are prevented from being produced from the subterranean zone. Any suitable proppant particulates may be used, including, inter alia, graded sand, bauxite, ceramic materials, glass materials, walnut hulls, polymer beads, and the like. An example of a suitable proppant particulate is commercially available from CarboCeramics, Inc., of Irving, Tex., under the trade name "CARBOLITE®." Generally, the proppant particulates will have a size in the range of from about 4 to about 400 mesh, U.S. Sieve Series. In certain embodiments of the present invention, the proppant particulates comprise graded sand having a particle size in the range of from about 10 to about 70 mesh, U.S. Sieve Series. In certain embodiments of the present invention, the proppant particulates may be at least partially coated with a curable resin, relative permeability modifiers, tackifying agents, or some other flowback control agent or formation fine control agent. In certain embodiments of the present invention wherein proppant particulates are present in the treatment fluids of the present invention, the proppant particulates may be 20/40 CARBOLITE® proppant particulates. In certain embodiments of the present invention wherein proppant particulates are present in the treatment fluids, the proppant particulates may be present in an amount in the range of from about 0.01% to about 75% by weight of the treatment fluid. In certain embodiments of the present invention wherein proppant particulates are present in the treatment fluids, the proppant particulates may be present in an amount in the range of from about 12% to about 65% by weight of the treatment fluid.

In accordance with the present invention, fracturing fluids comprising degradable diverting agents may be used to successfully divert fluid from side fractures and effectively extend the length of a desired fracture and/or provide sufficient fracture width for placement of proppant particulates therein. After the fracturing treatment, the degradable diverting agents of the present invention generally decompose into a material that may be removed easily from the subterranean formation. In particular embodiments, the product of this decomposition also may act as an effective cleaning medium in the formation, as well. Such fracturing fluids may be particularly useful, inter alia, in naturally-fractured reservoirs or reservoirs that tend to form naturally tortuous fractures under hydraulic stimulation, and may be useful both in conventional hydraulic fracturing applications and in pinpoint fracturing stimulations.

Once the hydraulic treatment is complete and the diverting agent has decomposed, the products of the decomposition may be removed easily from the fracture system. In certain embodiments of the present invention, the products of this decomposition also may be used to further treat the subterranean formation. For example, in certain embodiments of the present invention where the diverting agent decomposes into an acid, such as lactic acid, the acid may act as an effective cleaning medium in the well. For example, the acid may be used to break any residual polymers that may be present in the formation, and/or to remove acid-soluble formation material. As another example, the decomposition of the diverting agent into an acid may lower the pH, which may cause a resin present in the formation to set, and/or may activate an oxidizer present in the formation.

An example of a treatment fluid that may be used in the methods of the present invention comprises 97.44% water by weight, 2% potassium chloride by weight, 0.2% LO-SURF 300 by weight, and 0.36% polylactic acid particles by weight. Another example of a treatment fluid that may be used in the methods of the present invention comprises 48.5% water by weight, 50% by weight of 20/40 CARBOLITE® proppant particulates, 1% potassium chloride by weight, 0.18% guar by weight, 0.1% LO-SURF 300 by weight, 0.045% CL-28M by weight, 0.01% BA-20 by weight, 0.02% MO-67 by weight, and 0.18% polylactic acid particles by weight.

In one embodiment, the treatment fluids described above may be used in variety of methods of the present invention to perform numerous functions in a subterranean formation. Referring now to FIG. 1, illustrated therein is a hydrojetting tool assembly 150, which in certain embodiments may comprise a tubular hydrojetting tool 140 and a tubular, ball-activated, flow control device 160. The tubular hydrojetting tool 140 generally includes an axial fluid flow passageway 180 extending therethrough and communicating with at least one angularly spaced lateral port 202 disposed through the sides of the tubular hydrojetting tubular hydrojetting tool 140. In certain embodiments, the axial fluid flow passageway 180 communicates with as many angularly spaced lateral ports 202 as may be feasible. A fluid jet forming nozzle 220 generally is connected within each of the lateral ports 202. In certain embodiments, the fluid jet forming nozzles 220 may be disposed in a single plane that may be positioned at a predetermined orientation with respect to the longitudinal axis of the tubular hydrojetting tool 140. Such orientation of the plane of the fluid jet forming nozzles 220 may coincide with the orientation of the plane of maximum principal stress in the formation to be fractured relative to the longitudinal axis of the well bore penetrating the formation.

The tubular, ball-activated, flow control device 160 generally includes a longitudinal flow passageway 260 extending therethrough, and may be threadedly connected to the end of the tubular hydrojetting tool 140 opposite from the coiled or jointed tubing 225. The longitudinal flow passageway 260 may comprise a relatively small diameter longitudinal bore 240 through an exterior end portion of the tubular, ball-activated, flow control device 160 and a larger diameter counter bore 280 through the forward portion of the tubular, ball-activated, flow control device 160, which may form an annular seating surface 290 in the tubular, ball-activated, flow control device 160 for receiving a ball 300. As will be understood by those skilled in the art with the benefit of this disclosure, before ball 300 is seated on the annular seating surface 290 in the tubular, ball-activated, flow control device 160, fluid may freely flow through the tubular hydrojetting tool 140 and the tubular, ball-activated, flow control device 160. After ball 300 is seated on the annular seating surface 290 in the tubular, ball-activated, flow control device 160 as illustrated in FIG. 1, flow through the tubular, ball-activated, flow control device 160 may be terminated, which may cause fluid pumped into the coiled or jointed tubing 225 and into the tubular hydrojetting tool 140 to exit the tubular hydrojetting tool 140 by way of the fluid jet forming nozzles 220 thereof. When an operator desires to reverse-circulate fluids through the tubular, ball-activated, flow control device 160, the tubular hydrojetting tool 140 and the coiled or jointed tubing 225, the fluid pressure exerted within the coiled or jointed tubing 225 may be reduced, whereby higher pressure fluid surrounding the tubular hydrojetting tool 140 and tubular, ball-activated, flow control device 160 may flow freely through the tubular, ball-activated, flow control device 160, causing the ball 300 to disengage from annular seating surface 290, and through the fluid jet forming nozzles 220 into and through the coiled or jointed tubing 225.

Optionally, an operator may elect to employ a pressure sensor (not shown) or flow meter (not shown) as part of the hydrojetting tool assembly 150. A wide variety of pressure sensors or flow meters may be used. In certain embodiments, the pressure sensor or flow meter may be capable of storing data that may be generated during a subterranean operation until a desired time, e.g., until the completion of the operation when the pressure sensor or flow meter is removed from the subterranean function. In certain embodiments of the present invention, the incorporation of a pressure sensor or flow meter into the hydrojetting tool assembly 150 may permit an operator to evaluate conditions in the subterranean formation (which conditions may include, but are not limited to, parameters related to the creation or enhancement of the fracture) in real time or near-real-time, and, inter alia, to undertake a remediative step in real time or near-real-time. Example of remediative steps include, inter alia, swapping from a proppant-laden fluid to a linear fluid, reducing the concentration of a proppant present in the fluid, and reducing the viscosity of the fluid. In certain embodiments of the present invention, the operator may be able to determine, in real-time, that the fracture in the subterranean formation has been created or enhanced to a desired extent. In certain embodiments, the operator may move hydrojetting tool assembly 150 to a different zone in the same, or different, formation after determining, in real time, that the fracture has been created or enhanced to a desired extent. As referred to herein, the term "real time" will be understood to mean a time frame in which the occurrence of an event and the reporting or analysis of it are almost simultaneous; e.g., within a maximum duration of not more than two periods of a particular signal (e.g., a pressure signal, electrical signal, or the like) being evaluated. For example, an operator may view, in real time, a plot of the pressure in the formation that has been transmitted by the optional pressure sensor (not shown), and determine, at a particular time during the fracturing operation, that an increase, or multiple increases, in the slope of the pressure indicate the need to perform a remediative step such as those described above. One of ordinary skill in the art, with the benefit of this disclosure, will be able to evaluate a real time plot of the pressure in the formation, and evaluate conditions in the formation, and determine the appropriate remediative step to perform in response. For example, an operator may use the flow meter, in real time, to compare the flow of fluid past the end of the hydrojetting tool assembly 150 to determine the quantity of fluid that is flowing into the at least one fracture in the subterranean formation, and to determine the quantity of fluid that is flowing past the hydrojetting tool assembly 150 and that may be leaking off into other areas; the operator may evaluate such data from the flow meter, and adjust the fluid flow rate and jetting pressure accordingly. One of ordinary skill in the art, with the benefit of this disclosure, will be able to evaluate data from the flow meter, and determine the appropriate adjustments to make to the fluid flow rate and jetting pressure.

Figure 2:
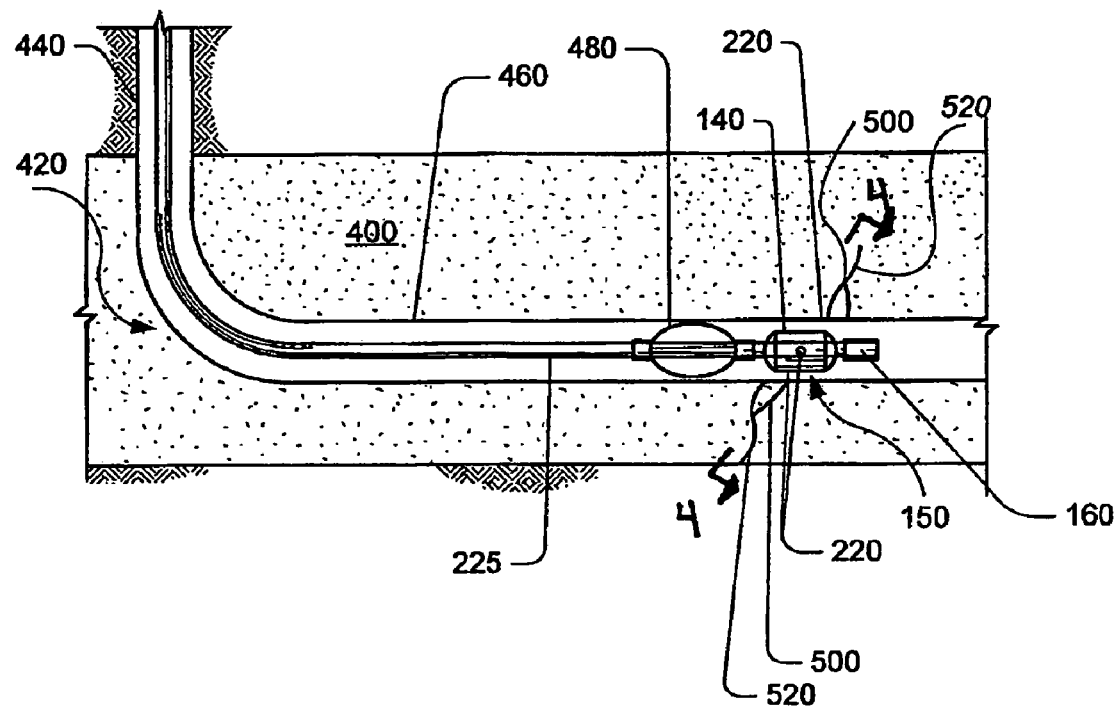
FIG. 2 shows the hydrojetting tool in use in a deviated open hole welbore in a hydrocarbon-producing subterranean formation.

Referring now to FIG. 2, a hydrocarbon-producing subterranean formation 400 is illustrated penetrated by a deviated open hole well bore 420. The deviated well bore 420 includes a substantially vertical portion 440 which extends to the surface, and a substantially horizontal portion 460 which extends into the formation 400. Though FIG. 2 illustrates an open hole well bore, it will be understood that the methods of the present invention also may be used in well bores having casing disposed therein; it further will be understood that the methods of the present invention also may be used in a variety of well bore configurations, including, but not limited to, those that are entirely vertical and those that are substantially vertical.

The coiled or jointed tubing 225 having the hydrojetting tool assembly 150, and an optional centralizer 480, attached thereto is shown disposed in the well bore 420. Prior to placing the hydrojetting tool assembly 150, the optional centralizer 480 and the coiled or jointed tubing 225 into the well bore 420, an operator may determine the orientation of the plane of maximum principal stress in the formation 400 to be fractured with respect to the longitudinal direction of the well bore 420 utilizing known information or techniques and tools available to those of ordinary skill in the art. Thereafter, the tubular hydrojetting tool 140 may be selected having the fluid jet forming nozzles 220 disposed in a plane oriented with respect to the longitudinal axis of the tubular hydrojetting tool 140 in a manner that aligns the plane containing the fluid jet forming nozzles 220 with the plane of the maximum principal stress in the formation 400 when the tubular hydrojetting tool 140 is positioned in the well bore 420. As is well understood in the art, when the fluid jet forming nozzles 220 are aligned in the plane of the maximum principal stress in the formation 400 to be fractured and a fracture is formed therein, a single microfracture may be formed that may extend outwardly from and around the well bore 420 in the plane of maximum principal stress. In certain embodiments of the present invention, an operator may elect not to align the fluid jet forming nozzles 220 of the tubular hydrojetting tool 140 with the plane of maximum principal stress in the formation 400; in such embodiments, each fluid jet may form an individual cavity and fracture in the formation 400.

Figure 4:
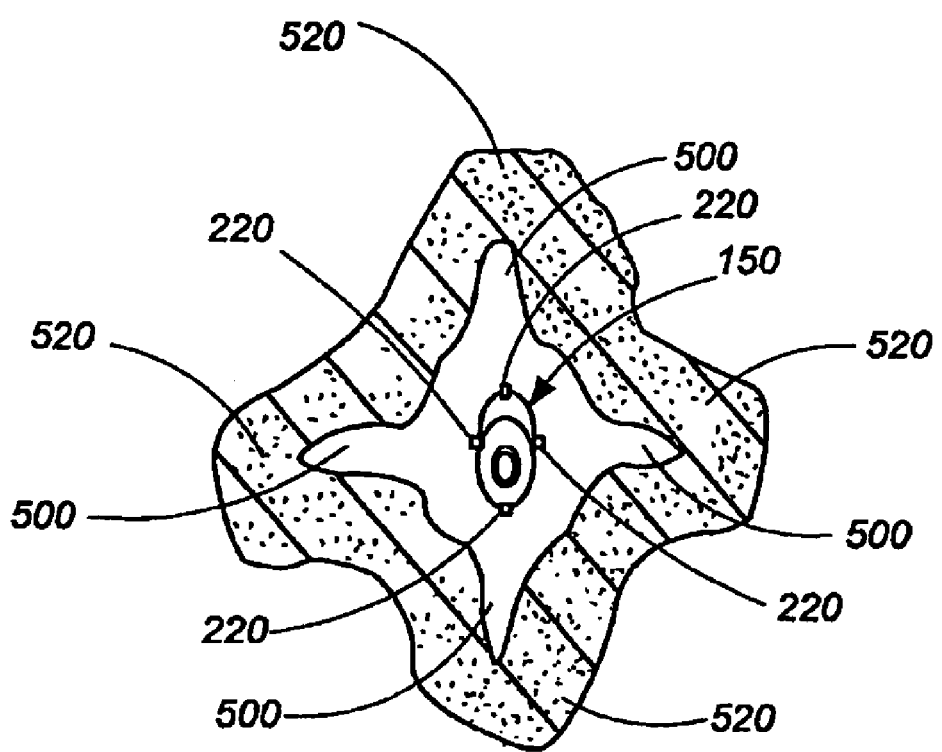
FIG. 4 shows a cross-sectional view of the cavities and microfractures formed in the deviated wellbore by the hydrojetting tool.

Once the hydrojetting tool assembly 150 has been placed in the well bore 420, a treatment fluid that may be used in the methods of the present invention, such as those that have been described herein, may be circulated through the coiled or jointed tubing 225 and through the hydrojetting tool assembly 150 so as to flow through the open tubular, ball-activated, flow control device 160 and circulate through the well bore 420. In certain embodiments, the circulation may be continued for a period of time sufficient to clean out debris, pipe dope and other materials from inside the coiled or jointed tubing 225 and from the well bore 420. Once a desired volume of the treatment fluid has been placed in well bore 420, and hydrojetting tool assembly 150 has been positioned adjacent the formation 400 that is to be fractured, ball 300 (shown in FIG. 1) may be caused to seat on the annular seating surface 290 (shown in FIG. 1) in the tubular, ball-activated, flow control device 160, thereby directing the entirety of the treatment fluid through the fluid jet forming nozzles 220 of the tubular hydrojetting tool 140. In certain embodiments, ball 300 may be caused to seat on annular seating surface 290 by dropping ball 300 through coiled or jointed 225, through the tubular hydrojetting tool 140 and into the tubular, ball-activated, flow control device 160 while the treatment fluid continues to flow through the coiled or jointed tubing 225 and the hydrojetting tool assembly 150; in certain other embodiments, ball 300 may be trapped in the tubular hydrojetting tool 140, and will seat when fluid flows through coiled or jointed tubing 225, forcing fluid out the fluid jet forming nozzles 220. After ball 300 has been caused to seat on annular seating surface 290, the rate of circulation of the low-molecular weight fluid into the coiled or jointed tubing 225 and through the tubular hydrojetting tool 140 may be increased to a level whereby the pressure of the treatment fluid that is jetted through the fluid jet forming nozzles 220 may reach a jetting pressure sufficient to perforate the walls of well bore 420 and cause the creation of cavities 500 and microfractures 520 in the subterranean formation 400 as illustrated in FIGS. 2 and 4.

Once a cavity 500 is formed, the operator may, inter alia, close in the annulus, which may increase the pressure and thereby assist in creating a dominant fracture adjacent the tubular hydrojetting tool 140. Fluid may be flowed through the annulus to increase the flow rate of treatment fluid into the fracture, thereby assisting in propagating the fracture. Flowing treatment fluid through the annulus also may assist in overcoming any leak-off of fluid into other perforations that may occur. Generally, the jet differential pressure at which the treatment fluid is jetted from the fluid jet forming nozzles 220 of the tubular hydrojetting tool 140 to result in the formation of cavities 500 and microfractures 520 in the formation 400 is a pressure in the range of from about 500 to about 5,000 psi. In certain embodiments, the jet differential pressure at which the treatment fluid is jetted from the fluid jet forming nozzles 220 of the tubular hydrojetting tool 140 is a pressure of approximately two times the pressure required to initiate a fracture in the formation, less the ambient pressure in the well bore adjacent to the formation. The pressure required to initiate a fracture in a particular formation may depend upon, inter alia, the particular type of rock and/or other materials that form the formation and other factors known to those skilled in the art. Once one or more dominant fractures have been created, a valve on the annulus may be opened, and fluid flow into the annulus may be initiated so as to further enhance or extend the one or more dominant fractures. Among other things, flowing a treatment fluid through the annulus, as well as through coiled or jointed tubing 225, may provide the largest possible flow path for the treatment fluid, thereby increasing the rated at which the treatment fluid may be forced into formation 400. Among other things, flowing the treatment fluid through both the annulus and through coiled or jointed tubing 225 may reduce erosion of fluid jet forming nozzles 220 when the treatment fluid is proppant-laden.

As a treatment fluid flows through the subterranean formation, the degradable diverting agents described herein desirably may bridge or obstruct pore throats in smaller fractures that may be perpendicular to the one or more dominant fractures being formed in the formation. Among other things, this may provide additional flow capacity that may facilitate extending one or more dominant fractures in the formation.

Once one or more dominant fractures in formation 400 have been created and then extended or enhanced to a desired extent, hydrojetting tool assembly 150 may be moved within well bore 420 to other zones in the same, or different, formation and the process described above may be repeated so as to create perforations in the walls of well bore 420 adjacent such other zones, and to create or enhance dominant fractures in such other zones, as previously described herein. Among other things, the degradable nature of the degradable diverting agents described herein may facilitate increased hydrocarbon production from the formation after the conclusion of the treatment operation, inter alia, because the degradation of the degradable diverting agents may enhance flow of hydrocarbons from the formation into the one or more dominant fractures, from which point the hydrocarbons may flow to the well bore and then to the surface, where they may be produced. Furthermore, in certain embodiments of the present invention, the degradation of the degradable diverting agent also may result in the generation of an acid that may assist in cleaning damaged portions of the formation, which also may desirably enhance the flow of hydrocarbons to the well bore and then to the surface.

When the well bore 420 is deviated (including horizontal well bores) as illustrated in FIG. 2, the optional centralizer 480 may be utilized with the hydrojetting tool assembly 150, inter alia, to insure that each of the fluid jet forming nozzles 220 has a proper stand-off clearance from the walls of the well bore 420, (e.g., a stand-off clearance in the range of from about ¼ inch to about 2 inches). At a stand-off clearance of about 1.5 inches between the face of the fluid jet forming nozzles 220 and the walls of the well bore and when the fluid jets formed flare outwardly at their cores at an angle of about 20 degrees, the jet differential pressure required to form the cavities 500 and the microfractures 520 generally is a pressure of about 2 times the pressure required to initiate a fracture in the formation less the ambient pressure in the well bore adjacent to the formation. When the stand-off clearance and degree of flare of the fluid jets are different from those given above, an operator may use formulae such as the following to calculate the jetting pressure:

$$Pi=Pf-Ph \quad \text{FORMULA I}$$

$$\Delta P/Pi=1.1[d+(s+0.5)\tan(\text{flare})]^2/d^2 \quad \text{FORMULA II}$$

wherein;
Pi=difference between formation fracture pressure and ambient pressure (psi);
Pf=formation fracture pressure (psi);
Ph=ambient pressure (psi);
ΔP=the jet differential pressure (psi);
d=diameter of the jet (inches);
s=stand off clearance (inches); and
flare=flaring angle of jet (degrees).

As mentioned above, proppant particulates may be combined with the treatment fluids being circulated so that it is carried into the cavities 500, as well as at least partially into the microfractures 520 connected to the cavities. The proppant particulates function, inter alia, to prop open the microfractures 520 and thereby prevent them from completely reclosing upon termination of the hydrojetting process. In order to insure that proppant particulates remain in the fractures upon termination of the hydrojetting process, the jetting pressure preferably may be slowly reduced to allow the fractures to close upon the proppant particulates that are held within the fractures by the fluid jetting during the closure process. In addition to propping the fractures open, the presence of the proppant particulates, (e.g., sand) in the fluid being jetted facilitates the cutting and erosion of the formation by the fluid jets. As indicated, additional abrasive material can be included in the treatment fluids, as can one or more acids that may react with and dissolve formation materials to thereby enlarge the cavities and fractures as they are formed. Once one or more microfractures are formed as a result of the above procedure, the hydrojetting tool assembly 150 may be moved to a different position (e.g., a different region within the formation), and the hydrojetting procedure may be repeated to form one or more additional microfractures that may be spaced a distance from the initial microfracture or microfractures.

Figure 3:
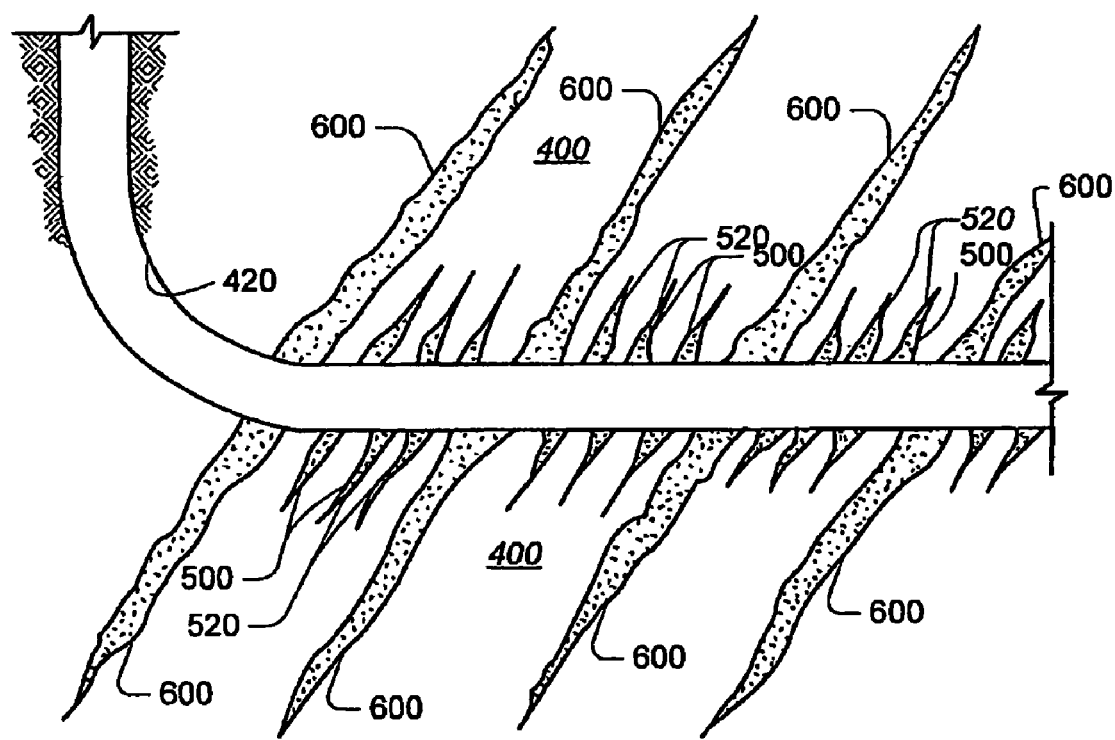
FIG. 3 shows extended fractures, cavities, and microfractures formed in the deviated welbore by the hydrojetting tool.

As mentioned above, some or all of the microfractures produced in a subterranean formation may be extended into the formation by pumping a fluid into the well bore to raise the ambient pressure therein. In performing the methods of the present invention to create and extend at least one fracture in the subterranean formation, the hydrojetting tool assembly 150 may be positioned in the well bore 420 adjacent the formation 400 to be fractured, and fluid may be jetted through the fluid jet forming nozzles 220 against the formation 400 at a jetting pressure sufficient to form the cavities 500 and the microfractures 520. Simultaneously with the hydrojetting of the formation, a fluid may be pumped into the well bore 420 at a rate sufficient to raise the ambient pressure in the well bore adjacent the formation to a level such that the cavities 500 and the microfractures 520 are enlarged and extended, whereby enlarged and extended fractures 600 (shown in FIG. 3) are formed. As in an embodiment that is illustrated in FIG. 3, the enlarged and extended fractures 600 may be formed in a spaced relationship along well bore 420 with groups of the cavities 500 and microfractures 520 formed therebetween.

Therefore, the present invention is well adapted to attain the ends and advantages mentioned as well as those that are inherent therein. While the invention has been depicted and described with reference to embodiments of the invention, such a reference does not imply a limitation on the invention, and no such limitation is to be inferred. The invention is capable of considerable modification, alternation, and equivalents in form and function, as will occur to those ordinarily skilled in the pertinent arts and having the benefit of this disclosure. The depicted and described embodiments of the invention are exemplary only, and are not exhaustive of the scope of the invention. Consequently, the invention is intended to be limited only by the spirit and scope of the appended claims, giving full cognizance to equivalents in all respects.

What is claimed is:

1. A method of fracturing a subterranean formation, comprising:
   providing a fracturing fluid comprising a degradable diverting agent that comprises at least one degradable material selected from the group consisting of a chitin, a chitosan, a protein, an orthoester, a polyanhydride, an aliphatic polycarbonate, a poly(orthoester), a poly (amino acid), a poly(ethylene oxide), and a polyphosphazene;
   introducing the fracturing fluid into a subterranean formation at a pressure sufficient to create or enhance at least one fracture therein;
   allowing the degradable diverting agent to at least partially obstruct one or more pore throats in the fracture; and
   permitting the degradable diverting agent to degrade.

2. The method of claim 1, wherein the degradable diverting agent is in particulate form.

3. The method of claim 1, wherein the degradable diverting agent further comprises a stereoisomer of a poly(lactide).

4. The method of claim 1, wherein the fracturing fluid further comprises a relative permeability modifier.

5. The method of claim 1, wherein the fracturing fluid further comprises a proppant particulate.

6. The method of claim 5, wherein the proppant particulate is at least partially coated with an additive selected from the group consisting of curable resins, relative permeability modifiers, tackifying agents, flowback control agents, formation fine control agents, and combinations thereof.

7. The method of claim 5, further comprising depositing the proppant particulate into the created or enhanced fracture.

8. The method of claim 1 wherein the degradable diverting agent has a particle size distribution in the range of from about 0.1 micron to about 1.0 millimeter.

9. The method of claim 1 wherein the degradable diverting agent has a particle size distribution in the range of from about 1 micron to about 300 microns.

10. A method of fracturing a subterranean. formation comprising:
    positioning a hydrojetting tool having at least one fluid jet forming nozzle in a portion of the subterranean formation to be fractured;

jetting a fracturing fluid comprising a degradable diverting agent through the fluid jet forming nozzle against the formation at a pressure sufficient to form a cavity in the formation, wherein the degradable diverting agent comprises at least one degradable material selected from the group consisting of a chitin, a chitosan, a protein, an orthoester, a polyanhydride, an aliphatic polycarbonate, a poly(orthoester), a poly(amino acid), a poly(ethylene oxide), and a polyphosphazene;

further jetting the fracturing fluid through the nozzle to create or enhance at least one fracture in the formation;

allowing the degradable diverting agent to at least partially obstruct one or more pore throats in the fracture; and permitting the degradable diverting agent to degrade.

11. The method of claim 10 wherein further jetting the low-molecular-weight fluid through the nozzle to create or enhance at least one fracture in the formation comprises permitting stagnation pressure in the cavity to create or enhance the fracture.

12. The method of claim 10 further comprising aligning at least one fluid jet forming nozzle of the hydrojetting tool with the plane of maximum principal stress in the formation.

13. The method of claim 10 wherein the hydrojetting tool comprises a plurality of fluid jet forming nozzles.

14. The method of claim 10 further comprising circulating the fracturing fluid through the hydrojetting tool after positioning the tool in a portion of the subterranean formation to be fractured and before jetting the fracturing fluid through the fluid jet forming nozzle.

15. The method of claim 10 wherein the degradable diverting agent has a particle size distribution in the range of from about 0.1 micron to about 1.0 millimeter.

16. A method of enhancing production from multiple regions of a subterranean formation penetrated by a well bore during a single trip through the well bore, comprising:

positioning a hydrojetting tool having at least one fluid jet forming nozzle in a region of the subterranean formation to be fractured;

jetting a fluid through the at least one fluid jet forming nozzle against the formation at a pressure sufficient to create at least one fracture in the formation;

pumping a fluid comprising a degradable diverting agent into an annulus between the hydrojetting tool and the formation at a rate sufficient to raise the annular pressure to a level sufficient to extend the fracture into the formation, wherein the degradable diverting agent comprises at least one degradable material selected from the group consisting of a chitin, a chitosan, a protein, an orthoester, a polyanhydride, an aliphatic polycarbonate, a poly(orthoester), a poly(amino acid), a poly(ethylene oxide), and a polyphosphazene;

repositioning the hydrojetting tool in a different region of the formation;

jetting a fluid through the fluid jet forming nozzle against the formation at a pressure sufficient to create at least one second fracture in the formation;

pumping a fluid comprising a degradable diverting agent into the annulus between the hydrojetting tool and the formation at a rate sufficient to raise the annular pressure to a level sufficient to extend the second fracture into the formation;

allowing the degradable diverting agent to at least partially obstruct one or more pore throats in the fracture; and permitting the degradable diverting agent to degrade.

17. The method of claim 16 wherein the degradable diverting agent has a particle size distribution in the range of from about 0.1 micron to about 1.0 millimeter.

* * * * *